US008814232B2

(12) United States Patent
Bertolotti

(10) Patent No.: US 8,814,232 B2
(45) Date of Patent: Aug. 26, 2014

(54) OUTER DOOR HANDLE FOR AN AUTOMOBILE

(75) Inventor: Angelo Bertolotti, Turin (IT)

(73) Assignee: ITW Automotive Products GmbH & Co. KG, Iserlohn (DE)

( * ) Notice: Subject to any disclaimer, the term of this patent is extended or adjusted under 35 U.S.C. 154(b) by 340 days.

(21) Appl. No.: 13/000,043

(22) PCT Filed: Jun. 24, 2009

(86) PCT No.: PCT/IB2009/052719
§ 371 (c)(1), (2), (4) Date: Dec. 20, 2010

(87) PCT Pub. No.: WO2009/156958
PCT Pub. Date: Dec. 30, 2009

(65) Prior Publication Data

US 2011/0099763 A1 May 5, 2011

(30) Foreign Application Priority Data

Jun. 25, 2008 (DE) ......................... 10 2008 030 209

(51) Int. Cl.
*E05B 3/00* (2006.01)
*B60R 21/09* (2006.01)
*E05B 65/12* (2006.01)

(52) U.S. Cl.
CPC ................. *E05B 85/16* (2013.01); *E05B 77/06* (2013.01)
USPC ....................................................... 292/336.3

(58) Field of Classification Search
CPC ................................. E05B 77/06; E05B 85/16
See application file for complete search history.

(56) References Cited

U.S. PATENT DOCUMENTS

| | | | | |
|---|---|---|---|---|
| 3,719,248 | A * | 3/1973 | Breitschwerdt et al. | 180/271 |
| 5,669,642 | A * | 9/1997 | Kang | 292/336.3 |
| 6,007,122 | A * | 12/1999 | Linder et al. | 292/336.3 |
| 6,648,382 | B1 | 11/2003 | Moenig et al. | |
| 7,029,042 | B2 * | 4/2006 | Belchine, III | 292/336.3 |
| 7,070,216 | B2 * | 7/2006 | von zur Muehlen | 292/336.3 |
| 7,111,880 | B2 * | 9/2006 | Saitoh | 292/336.3 |

(Continued)

FOREIGN PATENT DOCUMENTS

| | | |
|---|---|---|
| DE | 1678024 B1 | 8/1971 |
| DE | 19738492 A1 | 3/1998 |

(Continued)

OTHER PUBLICATIONS

ISR for PCT/IB2009/052719 mailed Sep. 28, 2009.

*Primary Examiner* — Kristina Fulton
*Assistant Examiner* — Thomas Neubauer
(74) *Attorney, Agent, or Firm* — Lowe Hauptman & Ham LLP

(57) ABSTRACT

An external, automobile door handle system including an elongated grip manually accessible from the door outside and fitted at its ends with support protrusions, a first support protrusion resting pivotably at a support connected to the door structure and the second support protrusion being operationally linked to a swivel lever, the swivel lever being connected by a linkage or a cable to a door lock in a manner that said lock shall be opened when the grip is pulled out of the rest position into an open position. The automobile door handle system also includes a centrifugal weight which is supported displaceably in a similarly direction as the grip.

6 Claims, 3 Drawing Sheets

(56) References Cited

U.S. PATENT DOCUMENTS

Figure 1:
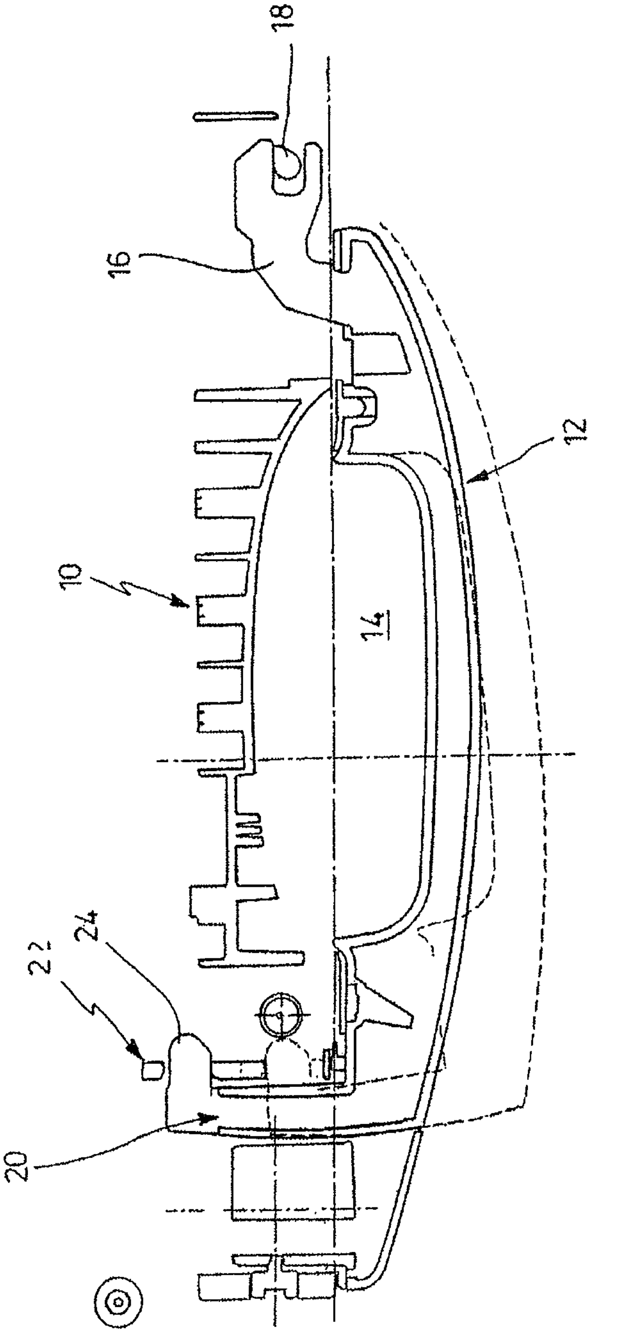

| | | | | |
|---|---|---|---|---|
| 7,597,368 | B2 * | 10/2009 | Savant et al. | 292/336.3 |
| 7,665,776 | B2 * | 2/2010 | Lang | 292/336.3 |
| 8,029,032 | B1 * | 10/2011 | Yang | 292/336.3 |
| 8,038,185 | B2 * | 10/2011 | Wood | 292/336.3 |
| 8,109,545 | B2 * | 2/2012 | Lukas et al. | 292/336.3 |
| 8,167,342 | B2 * | 5/2012 | Bertolotti | 292/336.3 |
| 2009/0085360 | A1 | 4/2009 | Bertolotti | |

FOREIGN PATENT DOCUMENTS

| | | | |
|---|---|---|---|
| DE | 19929022 | A1 | 1/2001 |
| DE | 10114965 | A1 | 10/2002 |
| DE | 10114966 | A1 | 10/2002 |
| DE | 102006027912 | A1 | 12/2007 |
| EP | 0795667 | A2 | 9/1997 |
| EP | 1182310 | A2 | 2/2002 |
| FR | 2882386 | A1 | 8/2006 |

* cited by examiner

OUTER DOOR HANDLE FOR AN AUTOMOBILE

RELATED APPLICATIONS

The present application is national phase of International Application Number PCT/IB2009/052719 filed Jun. 24, 2009, and claims priority from German Application Number 10 2008 030 209.0 filed Jun. 25, 2008.

External, automobile door handle systems typically are configured in a body skin recess accessed by the user's fingers to outwardly pivot a lever-like grip. Another embodiment mode uses a so-called pull-grip, wherein one end of the grip is pivotably connected to a support in turn solidly joined to the door structure. The other grip end is displaceable by means of a support protrusion inside said support. To open the door, the user pulls said grip outward, as a result of which a swivel lever pivotably resting on said support is pivoted, this lever in turn being linked by a rod system or a cable to a door lock. Said swivel lever and grip are spring-biased toward the rest position.

Inevitable there are accidents in which the automobile is impacted broadside. In such an impact the automobile is accelerated transversely, so that, by inertia, the grips tend to remain in place while the vehicle impulsively departs from its position. As a result an opening force is exerted on the pertinent grip, opening the door. Accordingly there is danger the vehicle car will open impulsively and the person seated next to the door may be flung outside the car.

An external car door handle system is known from the German patent document 10 2006 027 912 A1 wherein a centrifugal weight is displaceably supported in a limited way in the swivel support zone of the grip approximately in the same direction as is the grip, the centrifugal weight in one end position (blocked position) locking the grip in the rest position while releasing it in the other (release) position. In the release position, the centrifugal weight is prestressed and shall be moved into the locked position when the vehicle experiences a predetermined transverse acceleration, hence the automobile exerting an opening force on said grip. The grip secured in this instance against undesired opening is a pivot grip of the above cited kind, which is seized from underneath by the user when wishing to open the door, the grip substantially being pivoted about a horizontal axis.

The German patent document DE 199 29 022 A1 discloses how to support a centrifugal lever pivotably while affixed to the door and how to move said lever against a stop solidly joined to said door. In this way a beak connected to the door lever can only pivot in limited manner.

The object of the present invention is to create an external automobile door handle system that, in the event of a crash, and when under high transverse acceleration, shall be prevented from moving into said open position. This external handle system is a so-called pull handle system which the user pulls away from the door structure and which in the process is substantially pivoted about a vertical axis when said door shall be opened. The centrifugal weight shall be minimal in order to contribute little to the total vehicle weight.

This objective is attained by the claims of patent 1.

The external handle system of the present invention comprises, as in the conventional case, a centrifugal weight that is supported in similar manner as the grip and causes grip locking in a first end position (the lock position), and, in the second end position (the release position) releasing said grip, the centrifugal weight being displaced into the locked position when acted on by a predetermined transverse acceleration. In the present invention, the swivel lever comprises a holding element from which is suspended a pendular, elongated centrifugal lever subtending a longitudinal axis and pivotable about an axis approximately parallel to the pivot axis of the swivel lever. The centrifugal weight lever is biased by a spring toward the swivel lever and ordinarily will rest against latter. When manually operating the grip, the swivel lever is moved along at the same time and in turn drives the lever. When a centrifugal forces arises due to a transverse acceleration, the centrifugal weight lever is pivoted away from swivel lever in the direction of a first stop and, during an opening displacement of the grip, the centrifugal weight lever is displaced downward in the direction of its longitudinal axis toward and against a second stop. As a result the grip's opening displacement is blocked.

The external door handle system of the present invention is especially appropriate for the so-called pull handle system, the entailed complexity in attaining handle system locking in the event of transverse acceleration being minimal. Said additional complexity merely amounts to a centrifugal weight lever of comparatively little mass, especially when, as in one embodiment mode of the present invention, the mass of said centrifugal weight lever is concentrated at its free end. Accordingly the present invention effectively blocks the handle system from opening, without thereby significantly increasing the size of the door handle system and its mass.

An illustrative embodiment mode of the present invention is elucidated below in relation to the appended drawings.

Figure 2:
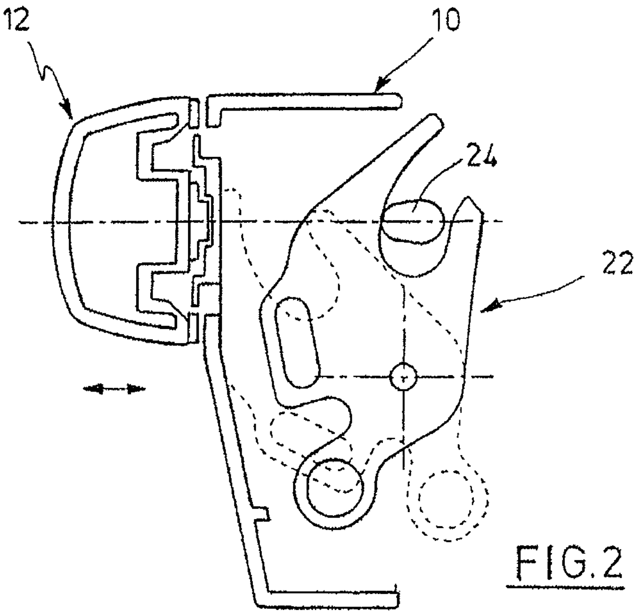
Figure 3:
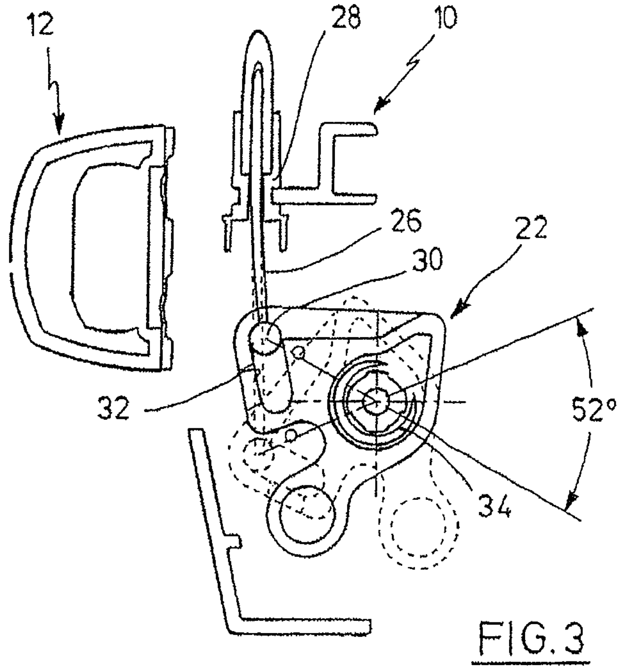

FIG. 1 shows a section of an external, automobile door handle system comprising a grip and support of the present invention, FIG. 2 is a cross-section of the grip of FIG. 1 in the region of a swivel lever of FIG. 1, FIG. 3 shows a cross-section slightly shifted relative to that of FIG. 2, of the door handle system of FIG. 1, and FIGS. 4-6 show a section similar to that of FIG. 1 during various operational stages.

FIG. 1 shows an integrated support 10 firmly affixed in a manner not shown to the door structure. The support 10 rests on an elongated grip 12 and together with said support subtends a grip spacing 14 allowing manual access from above so that, by pulling on the grip 12, latter shall be moved into an open position. This open position is indicated by dashed lines.

At one end the grip 12 is fitted with a bearing protrusion 16 which by means of a pin 18 of the support 10 rests pivotably about an axis perpendicular to the plane of the drawing respectively the plane of the grip 12. At its opposite end, the grip 12 is fitted with a further support protrusion 20 which substantially is displaceable perpendicularly to the grip 12 within the support 10 as shown in dashed lines on the left side of FIG. 1. A swivel lever 22 barely shown in FIG. 1 is fitted with an aperture entered by a lateral tip of the support protrusion. When the grip 12 is displaced into the position shown by dashed lines, the swivel lever 22 will pivot. Though not visible in this FIG. 1, the swivel lever is fitted with a cable or a linkage leading to the (omitted) lock of the door structure. By pulling on the grip 12 in the manner cited above, the door lock will be opened. Again (not shown), the swivel lever 12 is biased by a spring in a manner that the rest position shown in solid lines in FIG. 1 shall be assumed by the grip 12 when, in such an open position, no tensile force is applied to said grip.

FIG. 2 shows the swivel lever 22 and its linkage to the protrusion 24 of the support protrusion of the grip 12. FIG. 2 also illustrates how the swivel lever 22 is pivoted when the grip 12 is pulled into the open position. The pivoted position of the swivel lever 22 is indicated in FIG. 2 by dashed lines.

FIG. 3 shows a further part of the swivel lever 22 and its linkage to a cable 26 passing through a guide 28 of the support 10. The cable is suspended by means of a toggle 30 in an elongated slot 32 of the swivel lever 22. The pivoted state of the lever 22 when pulling the grip 12 again is indicated in dashed lines. The pivot angle is indicated being 52°. A spring indicated by 34 biases the swivel lever 22 toward/into its rest position.

Figure 6:
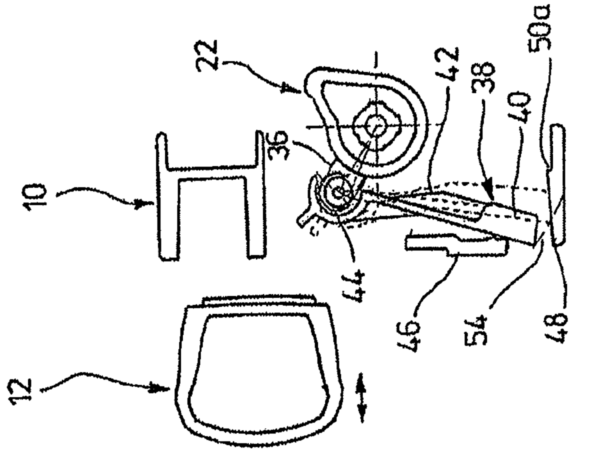
Figure 5:
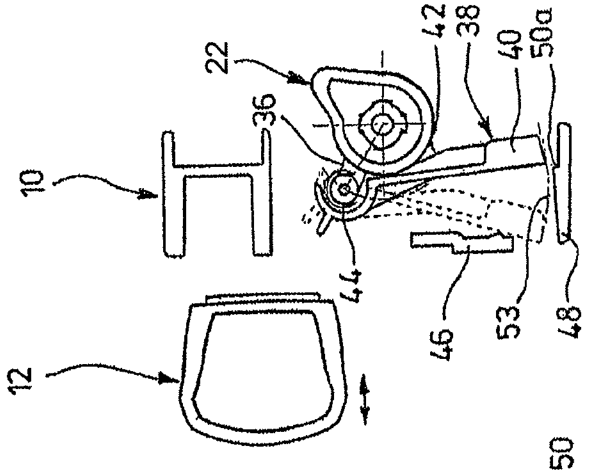
Figure 4:
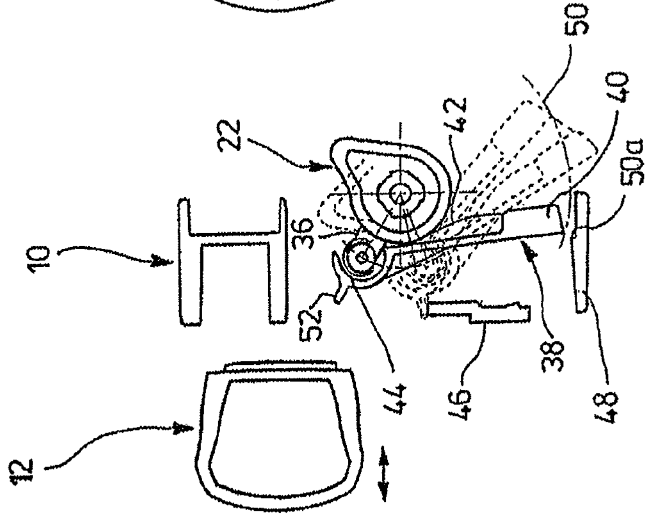

As shown by FIGS. 4 through 6, a pendular centrifugal weight lever 38 is suspended from a holding element 36 connected to the swivel lever 22. The centrifugal lever 38 is elongated and comprises a longitudinal axis, the centrifugal mass per se, as indicated by 40, being situated near the free end. The centrifugal lever 38 is fitted with a bevel 42 resting against an associated part of the swivel lever 22 due to the spring 44 biasing the centrifugal lever against the swivel lever 22.

A first elongated stop 46 solidly joined to the door is configured on the side of the centrifugal lever 38 opposite the swivel lever 22. A second elongated stop 48 is configured underneath the free end of the centrifugal lever 34 and runs substantially perpendicularly to the first stop 46. Said stop 48 is fitted at its upper side with a recess 50*a* allowing unhampered motion of the centrifugal lever 38, namely latter shall not be hampered during its ordinary operation by the top side of the stop 48.

FIGS. 4 and 5 show the position of the swivel lever 22 and of the centrifugal lever 38 in the rest position of the grip 12. If a pull is exerted on said grip, that is leftward in FIGS. 4 and 5, then the swivel lever 22 is pivoted into the dashed position and the centrifugal lever 38 shall pivoted with it as indicated by said dashed positions. In that process the free end of the centrifugal lever 38 pivots along an arc of circle indicated by the dash-dot line 50. As a result, the centrifugal lever 38 is not hampered by the stop 48. The maximum pivoting excursion of the swivel lever 22 is limited by a lateral protrusion 52 in the support zone of the centrifugal lever 38 coming to rest against the upper end of first stop 46 as shown in FIG. 4. Be it borne in mind that the stops 46, 48 also are part of the support 10 and hence they are affixed to the door.

FIG. 5 shows the rest position of the swivel lever 22 and of the centrifugal lever 38. In its dash-line position, the centrifugal lever 38 rests against the stop 46, its arcuate displacement being indicated by the dash-dot line 53. The centrifugal lever 38 assumes said dash-line position when being acted on by transverse acceleration that also might displace the grip 12 into the open position.

The solid line of FIG. 6 shows the locked position of the centrifugal lever 38, said locked position being shown in dashed lines in FIG. 5. Accordingly the centrifugal lever 38 rests against the stop 46. If then a transverse acceleration applies a pivoting force on the grip 12, a pivoting force is also applied thereby to the swivel lever 22 which then attempts to rotate counter-clockwise. However this rotation is limited because the free end of the centrifugal lever 38 impacts the top side of the second stop 48 as indicated by the dashed line of FIG. 6. The displacement of the lower end of the centrifugal lever 38 is indicated in FIG. 6 by the arcuate line 54. Accordingly FIG. 6 shows that the centrifugal lever 38 locks the door handle system when, due to transverse acceleration, an opening force acts on the grip 12 and the swivel lever 22.

The invention claimed is:

1. An external, automobile door handle system comprising an elongated grip manually accessible from the door outside and fitted at its ends with support protrusions, a first support protrusion resting pivotably at a support connected to the door structure and the second support protrusion being operationally linked to a swivel lever which is also pivotably supported at said support and is biased by a spring in a manner that the grip is biased toward and into a rest position, the swivel lever being connected by a linkage or a cable to a door lock in a manner that said lock shall be opened when the grip is pulled out of the rest position into an open position, further comprising a pendular, elongated centrifugal lever which is supported displaceably in a similar direction as the grip and which, when in a first end position (locked position), causes locking the grip, and when in a second end position (release position), causes releasing the grip, the centrifugal weight being moved into the locked position when a predetermined transverse acceleration acts on the automobile and applies an opening force to the grip, wherein the swivel lever comprises a holding element from which is suspended the centrifugal lever which is rotatable about an axis running approximately parallel to the axis of rotation of the swivel lever and approximately parallel a horizontal plane of the elongated grip, in that the centrifugal lever is biased by a spring toward the swivel lever and rests against the swivel lever and—upon manual actuation of the grip—shall be moved along with the swivel lever, in that the centrifugal lever, upon occurrence of a centrifugal force due to transverse acceleration, shall be pivoted away from the swivel lever in the direction of a first stop and, during the opening motion of the grip, shall be displaced downward in the direction of a longitudinal axis of the centrifugal lever against a second stop, thereby blocking further opening the grip.

2. Door handle system as claimed in claim 1, wherein the centrifugal lever cooperates by its free end with the second stop.

3. Door handle system as claimed in claim 1, wherein the free end of the centrifugal lever is also opposite the second stop when the centrifugal lever assumes its release position and in that said lever is released from the second stop only when the swivel lever is pivoted when opening the grip.

4. Door handle system as claimed in claim 1, wherein the second stop is fitted with a shoulder on its surface facing the centrifugal lever.

5. Door handle system as claimed in claim 1, wherein the centrifugal lever is fitted with centrifugal mass near its end.

6. A device, comprising:

an external, automobile door handle system including:

a swivel lever;

an elongated grip manually accessible from the door outside and fitted at its ends with a first support protrusion resting pivotably at a support connected to the door structure and a second support protrusion being operationally linked to the swivel lever which is also pivotably supported at said second support protrusion and is biased by a spring in a manner that the grip is biased toward and into a rest position, wherein the swivel lever is in mechanical communication with a door lock in a manner that said lock shall be opened when the grip is pulled out of the rest position into an open position, further comprising a pendular, elongated centrifugal lever which is supported displaceably in a similar direction as the grip and which, when in a first end position (locked position), causes locking the grip, and when in a second end position (release position), causes releasing the grip, the centrifugal weight being moved into the locked position when a predetermined transverse acceleration acts on the automobile and applies an opening force to the grip, wherein the swivel lever comprises a holding element from which is suspended the centrifugal lever which is rotatable about an axis running approximately parallel to the axis of rotation of the swivel lever and approximately parallel a horizontal plane of the elongated grip, in that the centrifugal lever is biased by a spring toward the swivel lever and rests against the swivel lever and—upon manual actuation of the grip—shall be moved along with the swivel lever, in that the centrifugal lever, upon occurrence of a centrifugal force due to transverse acceleration, shall be pivoted away from the swivel lever in the direction of a first stop and, during the opening motion of the grip, shall be displaced downward in the direction of a longitudinal axis of the centrifugal lever against a second stop, thereby blocking further opening the grip.

* * * * *